United States Patent
Motoyama et al.

(10) Patent No.: US 6,797,419 B2
(45) Date of Patent: Sep. 28, 2004

(54) ELECTRONIC APPARATUS POWERED BY FUEL CELL HAVING OXYGEN DENSITY DETECTOR

(75) Inventors: Hideyuki Motoyama, Kawasaki (JP); Hideki Tanaka, Kawasaki (JP); Satoshi Kazama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 410 days.

(21) Appl. No.: 10/093,481

(22) Filed: Mar. 11, 2002

(65) Prior Publication Data

US 2003/0044660 A1 Mar. 6, 2003

(30) Foreign Application Priority Data

Sep. 3, 2001 (JP) .......................................... 2001-266402

(51) Int. Cl.[7] .................................................. H01M 8/04
(52) U.S. Cl. ................................................ 429/23; 429/22
(58) Field of Search ........................................ 429/22, 23

(56) References Cited

U.S. PATENT DOCUMENTS 6,461,751 B1 * 10/2002 Boehm et al. ................. 429/13
6,739,122 B2 * 5/2004 Kitajima et al. ............... 60/277

FOREIGN PATENT DOCUMENTS

| JP | 60-20473 | 2/1985 |
|---|---|---|
| JP | 2-18868 | 1/1990 |
| JP | 3-108269 | 5/1991 |
| JP | 4-133271 | 5/1992 |
| JP | 4-308662 | 10/1992 |
| JP | 5-174855 | 7/1993 |
| JP | 6-60894 | 3/1994 |
| JP | 8-34105 | 3/1996 |
| JP | 8-250139 | 9/1996 |
| JP | 8-287931 | 11/1996 |
| JP | 9-213358 | 8/1997 |
| JP | 9-213359 | 8/1997 |
| JP | 9-274009 | 10/1997 |
| JP | 10-144327 | 5/1998 |
| JP | 10-284108 | 10/1998 |
| JP | 2000-9685 | 1/2000 |
| JP | 2000-282277 | 10/2000 |

* cited by examiner

Primary Examiner—Bruce F. Bell
(74) Attorney, Agent, or Firm—Staas & Halsey LLP

(57) ABSTRACT

An electronic apparatus, powered by a fuel cell, having a detector that monitors the oxygen density in the air provided to the fuel cell. The electronic apparatus has a plurality of power consumption modes one of which is selected based on the oxygen density to ensure steady operation. The electronic apparatus further includes an oxygen density regulator that controls the amount of the air provided to the fuel cell.

9 Claims, 9 Drawing Sheets

ELECTRONIC APPARATUS POWERED BY FUEL CELL HAVING OXYGEN DENSITY DETECTOR

BACKGROUND OF THE INVENTION

1. Field of the Invention

The present invention relates to an electronic apparatus powered by a fuel cell that generates electric power through chemical reaction of oxygen and fuel such as hydrogen and methanol.

2. Description of the Related Art

Many electronic apparatuses are powered by chemical batteries and/or AC adaptors that convert AC electric power into DC electric power. FIG. 1 shows an electronic apparatus, for example, which is powered by both a chemical cell and an AC adaptor. By controlling a switch 14, a controller 16 selectively connects either a chemical cell 10 or an AC adaptor 12 to an electronic circuit 18. For example, when the chemical cell 10 is sufficiently charged, the chemical cell 10 is connected to the electronic circuit 18. When the chemical cell 10 is insufficiently charged, however, the AC adaptor 12 is connected to the electronic circuit 18 and provides electric power.

A fuel cell is well known as a device that generates electric power through the chemical reaction of fuel such as hydrogen and methanol, and oxygen (See a publication of unexamined Japanese Patent Application 9-213358 and a publication of examined Japanese Patent Application 6-54674, for example). Recent reduction in size of fuel cells has made it possible to use the fuel cells as power supplies for electronic apparatuses.

Since the energy density of the fuel cells is higher than that of chemical batteries, the use of the fuel cells extends battery life of the apparatuses. Additionally, the fuel cells continuously generate electric power as long as fuel such as methanol is provided, by consuming oxygen in the air. Battery re-chargers and AC adaptors become unnecessary.

Oxygen must be continuously provided to the fuel cells, however, so that the fuel cells can operate appropriately. If the oxygen density in the air provided to the fuel cells is lowered for any reason, the fuel cells cannot generate enough electric power to sustain the operation of the electronic apparatuses.

In the case that the fuel cells are used in a closed space, the oxygen density around the electronic apparatuses must be checked accordingly in order to ensure stable operation of the electronic apparatuses.

SUMMARY OF THE INVENTION

Accordingly, it is a general object of the present invention to provide a novel and useful electronic apparatus in which one or more of the problems described above are eliminated.

Another and more specific object of the present invention is to provide an electronic apparatus, powered by a fuel cell, which monitors oxygen density in the air provided to the fuel cell in order to control the operation mode of the electronic apparatus.

To achieve one of the objects of the present invention, an electronic apparatus includes an electronic circuit, a fuel cell that generates electric power by having fuel react with oxygen contained in the air and provides electric power to the electronic circuit, an oxygen density detector which detects oxygen density contained in the air provided to the fuel cell, and a controller which controls, in response to a first signal indicating the oxygen density sent by the oxygen density detector, power consumption of said electronic circuit.

The apparatus described above is further characterized in that the controller stores, in response to reception of the first signal sent by the oxygen density detector, the first signal therein, determines whether the first signal stored therein falls within one of a plurality of oxygen density ranges, and sends, if the first signal stored therein falls within one of the oxygen density ranges, a second signal to the electronic circuit, and that the electronic circuit having a plurality of power consumption modes each corresponding to one of the oxygen density ranges, reads, in response to reception of the second signal, the first signal stored in the controller, and selects one of the power consumption modes thereof.

The electronic apparatus according to the present invention controls its power consumption based on the oxygen density in the air provided to the fuel cell. In other words, the electronic apparatus can operate at its best performance in a certain oxygen density environment.

The first signal indicating the oxygen density is not necessarily the value of oxygen density, but any signal in connection with the oxygen density. Accordingly, the oxygen density can be measured at any position as long as the oxygen density is measurable, even in the exterior of the electronic apparatus. Further, the oxygen density can be calculated based on the output property of the fuel cell.

Other objects, features, and advantages of the present invention will become more apparent from the following detailed description when read in conjunction with the accompanying drawings.

DETAILED DESCRIPTION OF THE PREFERRED EMBODIMENTS OF THE INVENTION

A description of the preferred embodiments of the present invention is now given in reference to drawings.

[First Embodiment]

Figure 1:
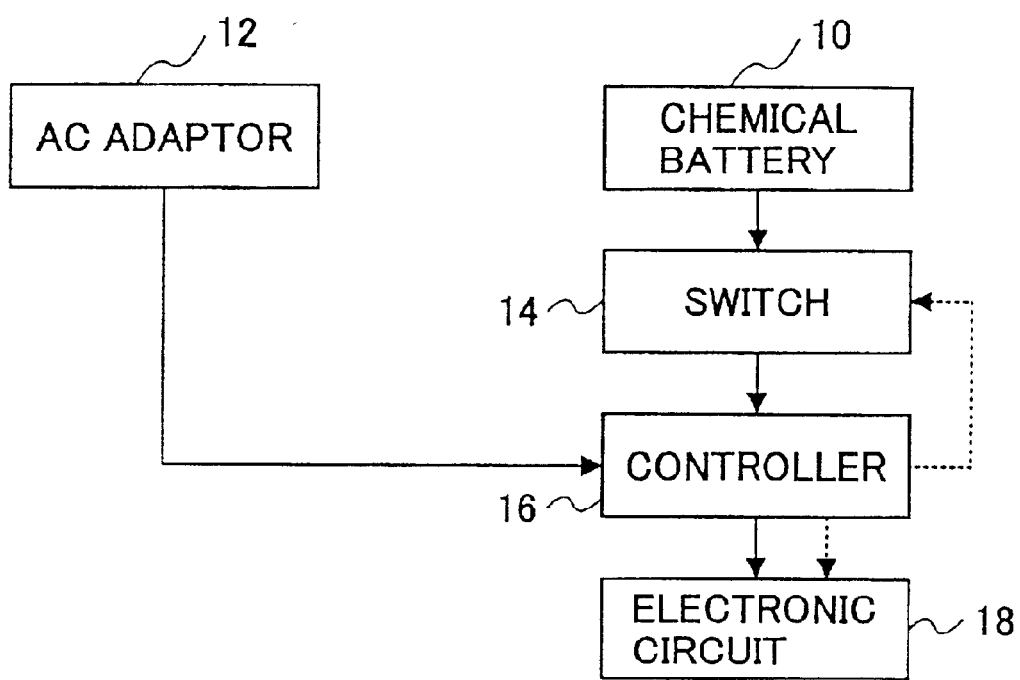
FIG. 1 is a block diagram showing an electronic apparatus, as an example of the prior art, in which a chemical cell and an AC adaptor are selectively switched.
Figure 2:
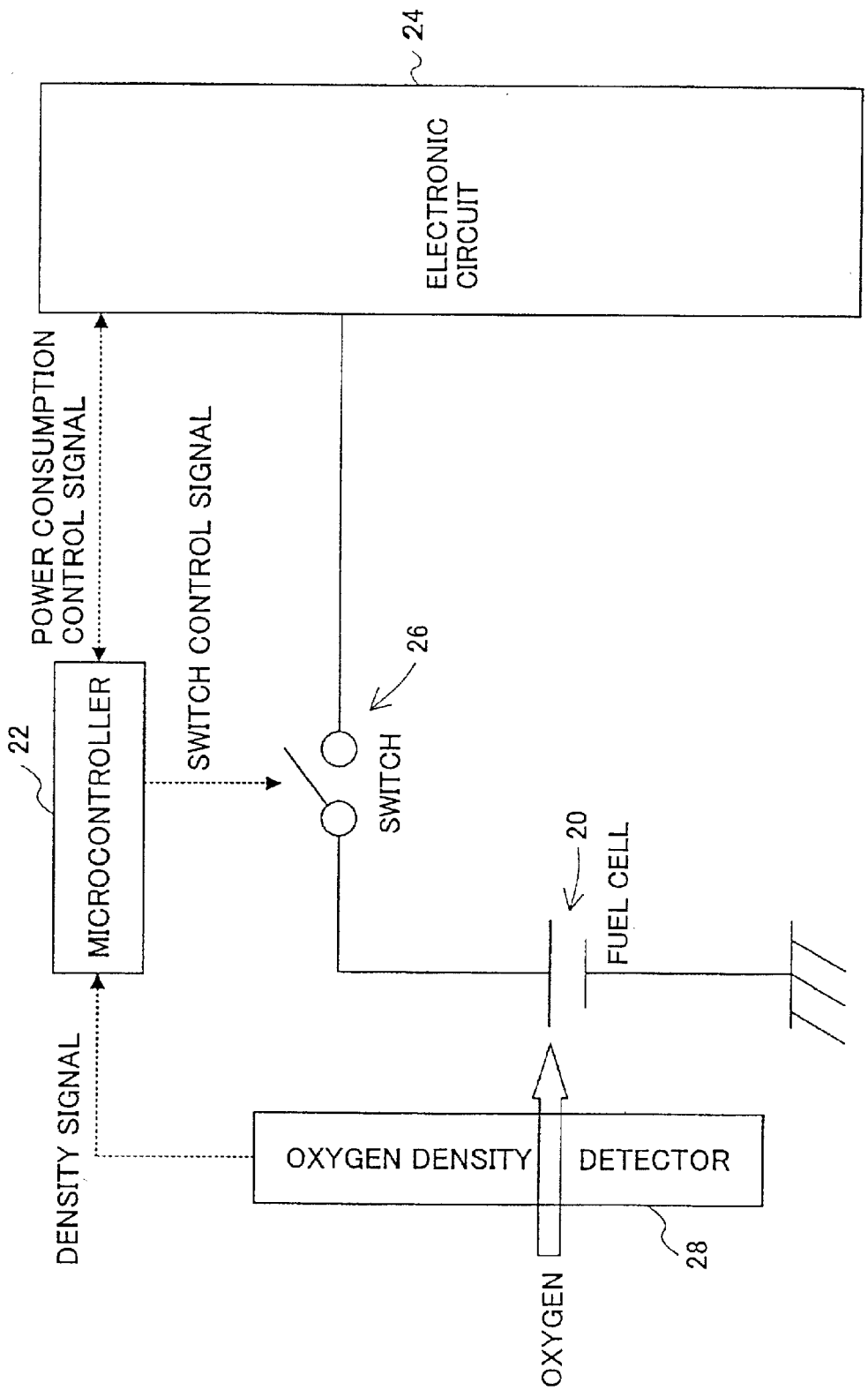
FIG. 2 is a block diagram showing a structure of the first embodiment of the present invention.

FIG. 2 is a block diagram showing the structure of an electronic apparatus in connection with the first embodiment of the present invention. The electronic apparatus can be a mobile electronic apparatus such as a notebook computer, a cellular phone, and a personal data assistant (PDA), or an electronic apparatus, which is not necessarily mobile, such as a piece of factory equipment, a piece of automobile equipment, and a household appliance.

The electronic apparatus includes a fuel cell 20, a microcontroller 22, an electronic circuit 24, a switch 26, and an oxygen density detector 28. The fuel cell 20 generates electric power by activating a chemical reaction of fuel, methanol, for example, and oxygen contained in the air. The electronic circuit 24 is provided with electric power by the fuel cell 20 through the switch 26, and performs various operations of the electronic apparatus.

The oxygen density detector 28 is provided in the neighborhood of the fuel cell 20, and detects the oxygen density of the air in the neighborhood of the fuel cell 20 as the oxygen density in the air provided to the fuel cell 20. The oxygen density detector 28 is, for example, a galvanic cell type oxygen sensor.

The microcontroller 22, in response to a density signal indicating oxygen density measured by the oxygen density detector 28, generates a power consumption control signal which is sent to the electronic circuit 24 to control operation modes in connection with power saving of the electronic circuit 24, and further generates a switch control signal which is sent to the switch 26 to turn on or off the switch 26. The microcontroller 22 can be powered by either the fuel cell 20 or another chemical cell which is not shown in FIG. 2.

Figure 3:
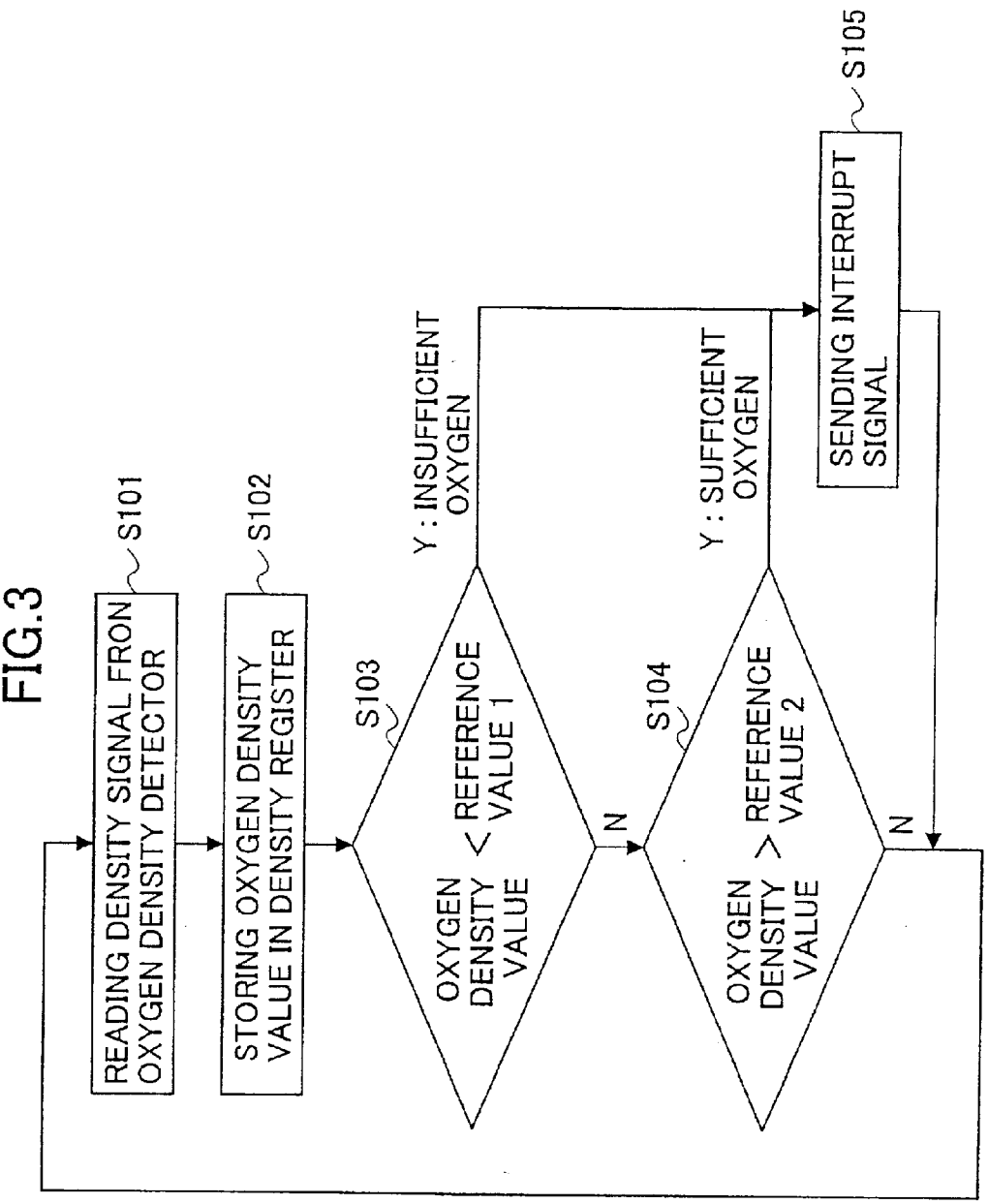
FIG. 3 is a flow diagram showing an operation of a controller of the first embodiment.

FIG. 3 is a flow diagram showing the operation of the microcontroller 22.

The microcontroller 22 cyclically reads the density signal from the oxygen density detector 28 (S101), and stores an oxygen density value indicated by the density signal measured by the oxygen density detector 28 in a density register thereof (S102). The microcontroller 22 checks whether the oxygen density value stored in the density register is smaller than a predetermined reference value 1 to determine whether the oxygen density is insufficient (S103). If the oxygen density value is greater than the reference value 1 (N branch of S103), the microcontroller 22 further checks whether the oxygen density value is greater than a predetermined reference value 2, which is greater than the reference value 1 (S104).

If the oxygen density value is smaller than the reference value 2, the microcontroller 22 reads, after a predetermined period of time, the density signal from the oxygen density detector 28 again (S101), and stores the oxygen density value corresponding to the density signal in the density register (S102). In the case that the oxygen density (the oxygen density value) measured by the oxygen density detector 28 is greater than the reference value 1 and smaller than the reference value 2, operations described above are repeated (S101 through S104).

If the oxygen density in the air provided to the fuel cell 20 decreases for any reason during the above process, and the oxygen density measured by the oxygen density detector 28 (the oxygen density value stored in the density register) becomes smaller than the reference value 1 (Y branch of S103), the microcontroller 22 sends an interrupt signal to the electronic circuit 24 as the power consumption control signal to inform the electronic circuit that the oxygen density is insufficient (S105).

On the other hand, if the oxygen density in the air provided to the fuel cell 20 increases, and the oxygen density value becomes greater than the reference value 2 (Y branch of S104), the microcontroller 22 sends an interrupt signal to the electronic circuit 24 to inform the electronic circuit that the oxygen density is sufficient (S105).

Figure 4:
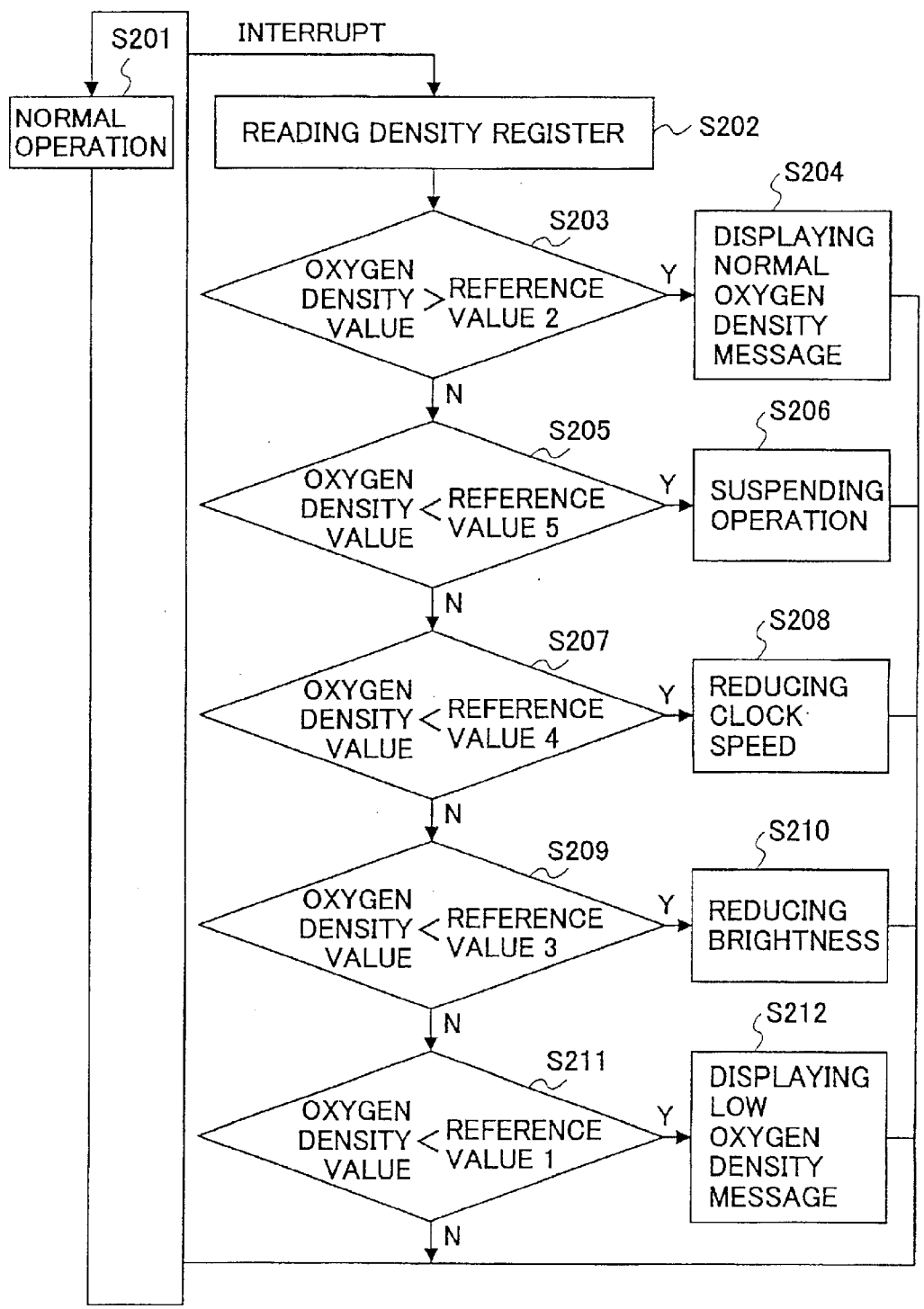
FIG. 4 is a flow diagram showing an operation of an electronic circuit, in connection with operation modes, of the first embodiment.

The electronic circuit 24 which receives the power consumption control signal follows a procedure shown in FIG. 4, for example.

Unless an interrupt signal sent by the microcontroller 22 is received, the electronic circuit 24 performs various processes (ordinary processes) which realize the functions of the electronic apparatus (S201). If an interrupt signal sent by the microcontroller 22 indicating insufficient oxygen density is received, the electronic circuit 24 reads the oxygen density value (<the reference value 1) stored in the density register in the microcontroller 22 (S202). The electronic circuit 24 determines whether the oxygen density value is smaller than the reference value 2 (N branch of S203). Then, the electronic circuit 24 controls its power consumption in some steps.

It is assumed that the oxygen density value is compared with the reference values arranged in the following order: reference value 1> reference value 3> reference value 4> reference value 5.

In the flow diagram shown in FIG. 4, the above process is performed in the following manner. It is determined whether the oxygen density value is smaller than the reference value 5 (S205). If the oxygen density value is greater than the reference value 5, it is determined whether the oxygen density value is smaller than the reference value 4 (S207). If the oxygen density value is greater than the reference value 4, it is determined whether the oxygen density value is smaller than the reference value 3 (S209). If the oxygen density value is greater than the reference value 3, it is further determined whether the oxygen density value is smaller than the reference value 1 (S211).

If the oxygen density value is smaller than the reference value 1 and greater than the reference value 3 (Y branch of S211), for example, the electronic circuit 24 displays, on a display unit (not shown) provided to the electronic apparatus, for example, a message that the oxygen density is decreasing as an alert (S212). If the oxygen density value is smaller than the reference value 3 and greater than the reference value 4 (Y branch of S209), the electronic circuit 24 lowers the brightness of illuminating devices such as the display unit and an indicator (S210). The reduction in the brightness reduces the power consumption of the electronic circuit 24.

Furthermore, if the oxygen density value is smaller than the reference value 4 and greater than the reference value 5 (Y branch of S207), the electronic circuit 24 reduces the frequency of a clock signal used to synchronize internal processes. Accordingly, since the process speed of the electronic apparatus 24 is reduced, the number of steps performed in a unit time is reduced followed by the reduction of the power consumption by the electronic circuit 24.

If the oxygen density value is smaller than the reference value 5 (Y branch of S205), the electronic circuit 24 suspends all operations (S206) because the electronic circuit 24 cannot sustain normal operations due to the lack of electric power. Operations are suspended by following the procedure shown in FIG. 5.

Figure 5:
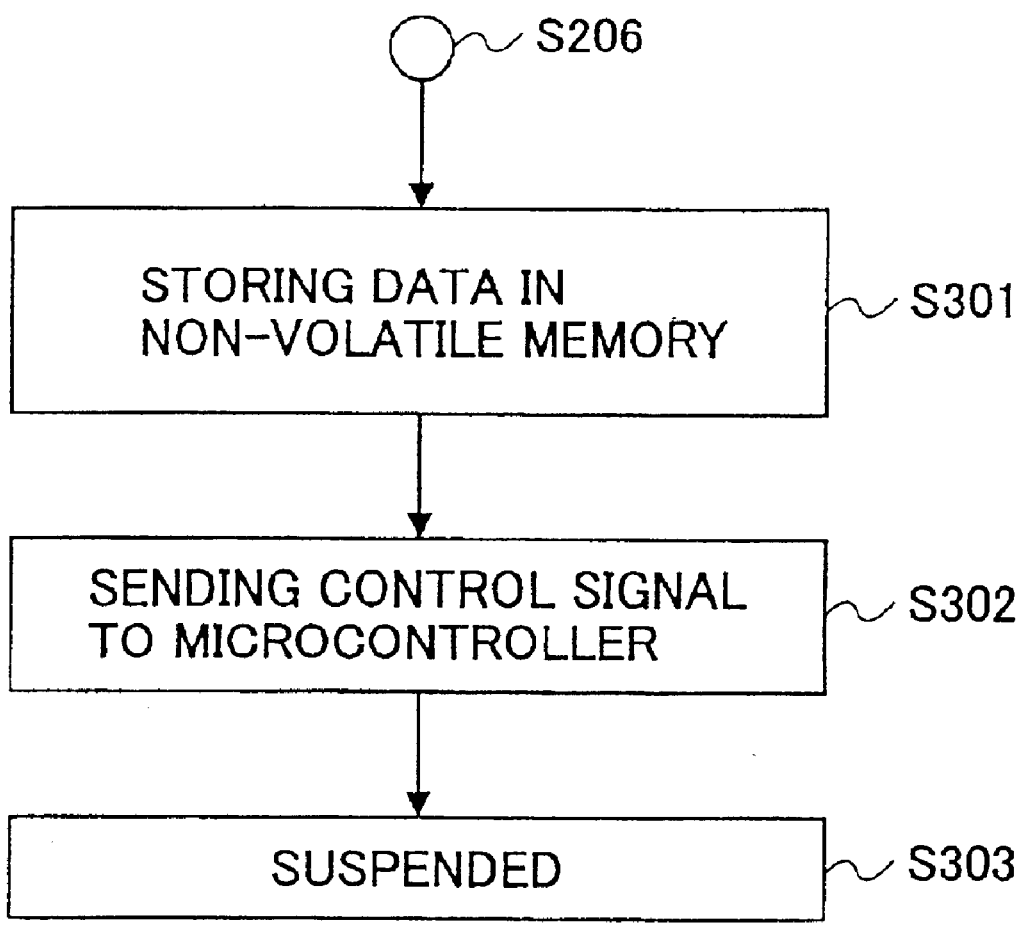
FIG. 5 is a flow diagram showing an operation of the electronic circuit, in connection with suspending operation, of the first embodiment.

In FIG. 5, the electronic circuit 24 stores data, stored in a volatile memory such as RAM, in a non-volatile memory such as flash memory (S301). Then, the electronic circuit 24 sends a power consumption control signal that instructs the microcontroller 22 to stop providing electric power (S302). The microcontroller 22 sends, in response to the reception of the power consumption control signal sent by the electronic circuit 24, a switch control signal, to the switch 26, to switch off the switch 26. The switch 26 is turned off in response to the reception of the switch control signal. Electric power provided to the electronic circuit 24 stops, and the electronic circuit 24 is set to a suspended state (S303).

In the event that the oxygen density in the air provided to the fuel cell 20 is reduced to a level not high enough to sustain the normal operation of the electronic circuit 24, data stored in a volatile memory of the electronic circuit 24 is stored in a non-volatile memory before the electronic circuit 24 is set to a suspended state.

The frequency of sampling the oxygen density signal by the microcontroller 22 (S101 in FIG. 3) and the reference values 1, 3, 4, and 5 are determined based on the rate of change of the oxygen density near the fuel cell 20 and output properties of the fuel cell 20 compared to the oxygen density. While the oxygen density is decreasing, the electronic circuit 24 performs the steps S212 (displaying low oxygen density message), S210 (reducing brightness), S208 (reducing clock speed), and S206 (suspending operation) in this order if appropriate values for the frequency of sampling and the reference values are chosen. In the process where the oxygen density is increasing, the electronic circuit 24 stops performing the steps in the opposite order, and finally returns to the normal operation mode.

Accordingly, as the oxygen density decreases, the electronic circuit 24 consumes less electric power, and as the oxygen density recovers, the electronic circuit 24 stops power saving procedure step by step back to the normal operation. That is, the electronic circuit 24 operates at the highest performance level possible using available electric power provided by the fuel cell 20, which is determined by the oxygen density provided to the fuel cell 20.

It is assumed in the above description that the electronic circuit 24 displays, on a display unit, a message indicating that the oxygen density is low (S212). Instead of the message, the electronic circuit 24 may light a predetermined lamp or make an alarm sound.

If the electronic circuit 24 receives an interrupt signal indicating that the oxygen density is normal instead of the interrupt signal indicating that the oxygen density is low, the electronic circuit 24 reads the oxygen density value, which is greater than the reference value 2 stored in the density register of the microcontroller 22 (S202). The electronic circuit 24 determines that the oxygen density value is greater than the reference value 2, which at is predetermined to check whether the oxygen density value indicates normal oxygen density (Y branch of S203). Then, the electronic circuit 24 shows a message on the display unit, indicating that the oxygen density is sufficient (S204). The message displayed on the display unit lets a user know that the fuel cell 20 is operating in a normal condition.

[Second Embodiment]

The second embodiment of the present invention will be described below. An electronic apparatus according to the second embodiment controls the volume of air, which is dependent on the oxygen density in the air, provided to a fuel cell.

Figure 6:
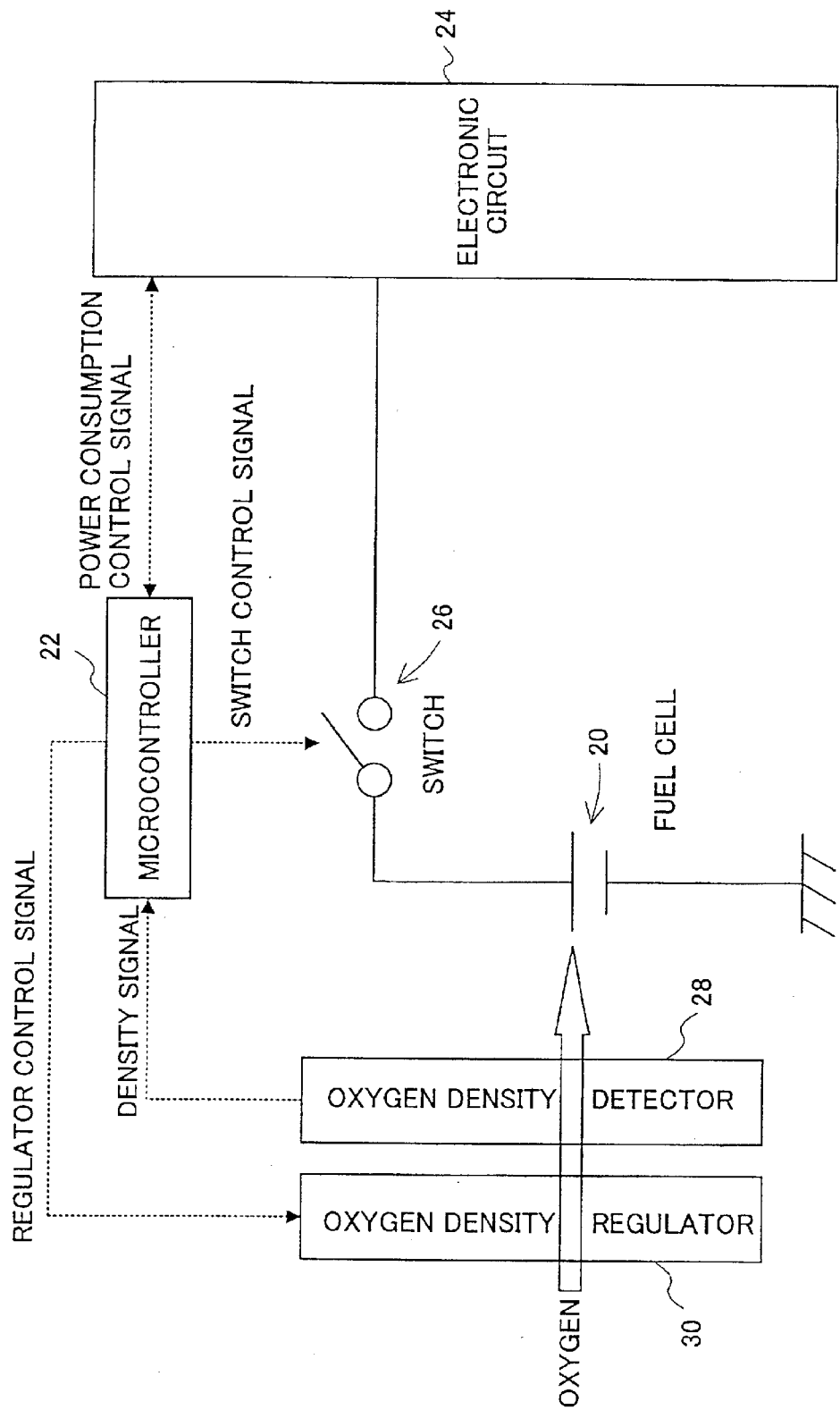
FIG. 6 is a block diagram showing a structure of the second embodiment of the present invention.

The electronic apparatus according to the second embodiment is configured, for example, as shown in FIG. 6. The same components as shown in FIG. 2 are referred to by the same numerals.

The electronic apparatus is provided a fuel cell 20, a microcontroller 22, an electronic circuit 24, a switch 26, an oxygen density detector 28, and an oxygen density regulator 30.

The oxygen density regulator 30 is a fan and a drive circuit thereof, for example, that blows the outside air into the electronic apparatus. The oxygen density regulator 30 can be powered by the fuel cell 20 or another chemical cell (not shown).

The oxygen density regulator 30 can be a mechanism that widens or narrows the opening of the fuel cell to control the volume of the air provided to the fuel cell, or the opening of the electronic apparatus to control the air flow into and out of the electronic apparatus, instead of active devices such as a fan. The oxygen density regulator 30 may be a device that controls the volume of oxygen supplied from an oxygen tank.

Figure 7:
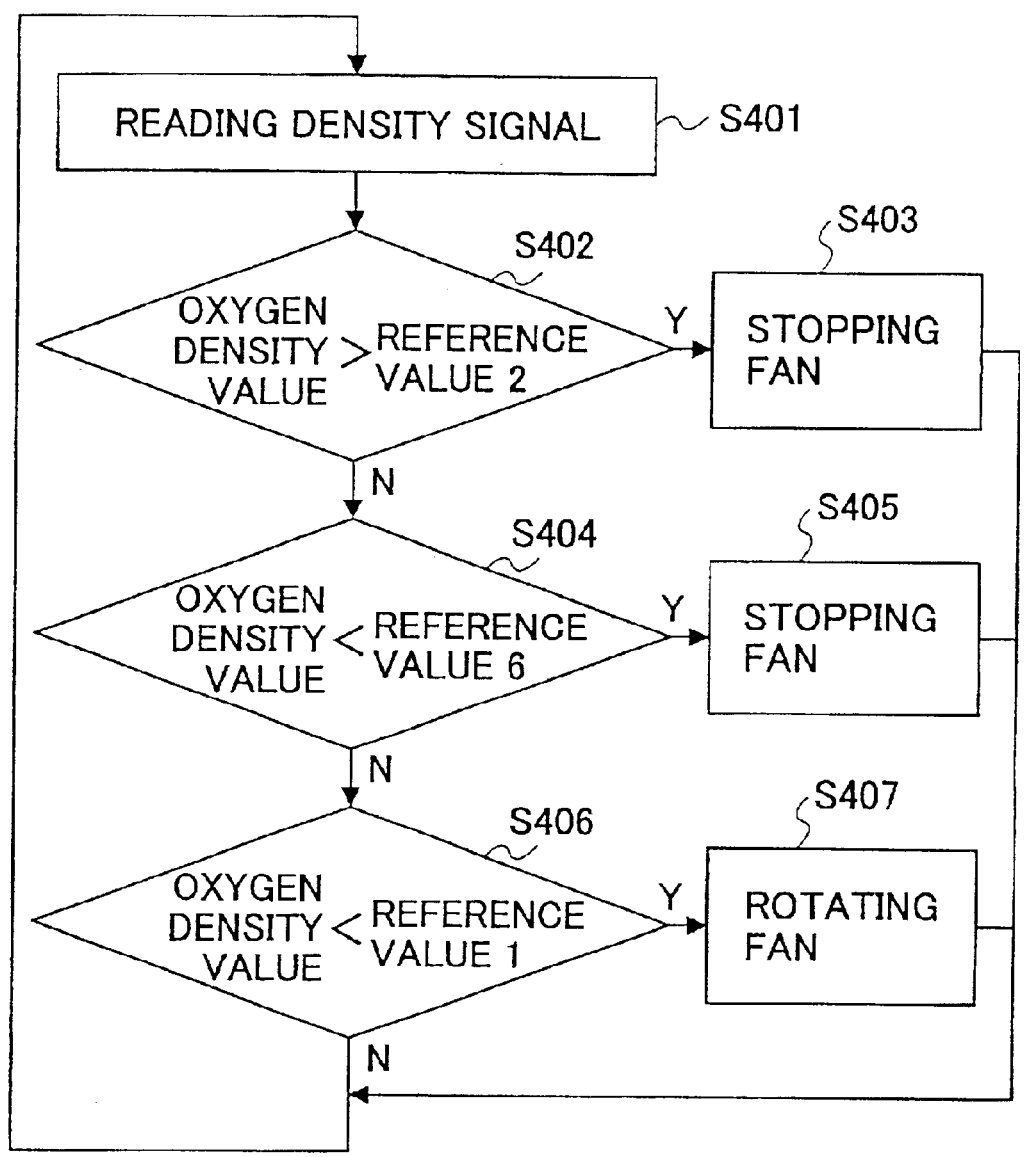
FIG. 7 is a flow diagram showing an operation of a controller of the second embodiment.

The microcontroller 22 follows, for example, a procedure shown in FIG. 7.

The microcontroller 22 receives a density signal from the oxygen density detector 28 (S401). The microcontroller 22 compares the oxygen density value indicated by the density signal, and controls the operation of the fan of the oxygen density regulator 30.

Particularly, the microcontroller 22 determines whether the oxygen density value is greater than the reference value 2, which means the air contains oxygen of a sufficient density (S402). If the result of the determination is negative (N branch of S402), the microcontroller 22 further checks whether the oxygen density value is smaller than a reference value 6 (S404). The reference value 6 is set at a value smaller than the reference value 1, a threshold of low oxygen density (the reference value 1> the reference value 6). If the oxygen density value is greater than the reference value 6, the microcontroller 22 further determines whether the oxygen density value is smaller than the reference value 1 to check whether the oxygen density is insufficient (S406).

In the procedure described above, the microcontroller 22 continuously, in every predetermined time period, unless the oxygen density value is smaller than the reference value 2 and greater than the reference value 1, reads the density signal from the oxygen density detector 28 (S401), and compares the oxygen density value corresponding to the density signal with the reference values 2, 6, and 1. Because the microcontroller 22 does not send any regulator control signal to the oxygen density regulator 30 under this condition, the fan of the oxygen density regulator 30 does not operate.

If the oxygen density around the fuel cell 20 lowers, the oxygen density value corresponding to the density signal sent by the oxygen density detector 28 falls into the range between the reference value 1 and the reference value 6 (the reference value 1> the reference value 6) (Y branch of S406), the microcontroller 22 outputs a regulator control signal to the oxygen density regulator 30 (S407). The oxygen density regulator 30 starts, in response to the regulator control signal, the fan thereof. The outside air is provided to the fuel cell 20 by this forced ventilation.

Even if the oxygen density around the fuel cell 20 rises beyond the reference value 1, the fan remains in operation. The oxygen density further rises, and eventually, if the oxygen density value becomes greater than the reference value 2 (Y branch of S402), the microcontroller 22 outputs a regulator control signal to the oxygen density regulator 30 to stop the fan (S403). The oxygen density regulator 30 stops the fan in response to the regulator control signal.

Ordinarily, as described above, the fan starts rotating when the oxygen density value becomes smaller than the reference value 1, and stops when the oxygen density value becomes greater than the reference value 2. The fan is repeatedly operated so that the oxygen density around the fuel cell 20 is maintained at a level where the fuel cell 20 can operate normally.

However, in the event that the oxygen density value further falls and becomes smaller than the reference value 6 in spite of the operation of the fan activated when the oxygen density value becomes smaller than the reference value 1 (Y branch of S404), the microcontroller 22 outputs a regulator control signal to the oxygen density regulator 30 to stop the fan (S405). This regulator control signal does stop the fan despite a situation where the oxygen density near the fuel cell 20 is low.

Under such a situation, the microcontroller 22 avoids the wasteful electric power being consumed by the oxygen density regulator 30 by stopping the fan because the oxygen density around the fuel cell 20 will not recover even if the fan is operated.

It is probable that the electronic apparatus is stored in a closed space such as a bag where the oxygen density of the total air is low. Rotating the fan does not solve the problem under such a situation. The total power consumption of the electronic apparatus is reduced by stopping the operation of the fan so that the oxygen contained in the air in the closed space does not run out.

As described above, the operation of the oxygen density regulator may include a mode where no oxygen is provided to the fuel cell.

The reference value 6 must be carefully determined in consideration of the output properties of the fuel cell 20 and the foreseeable necessity to stop the fan.

It is possible to set one or more reference values between the reference value 1 and the reference value 6, and to gradually lower the rotational speed of the fan based on the comparison between the oxygen density value and the reference values.

It is further possible to control the power consumption of the electronic circuit 24 as described above in connection with the first embodiment, in parallel to the control on the oxygen density regulator 30 described above in connection with the second embodiment.

[Third Embodiment]

The third embodiment of the present invention will be described below. An electronic circuit according to the third embodiment is provided with electric power by either a fuel cell or a chemical cell, selected by a switch based on the oxygen density in the air provided to the fuel cell.

Figure 8:
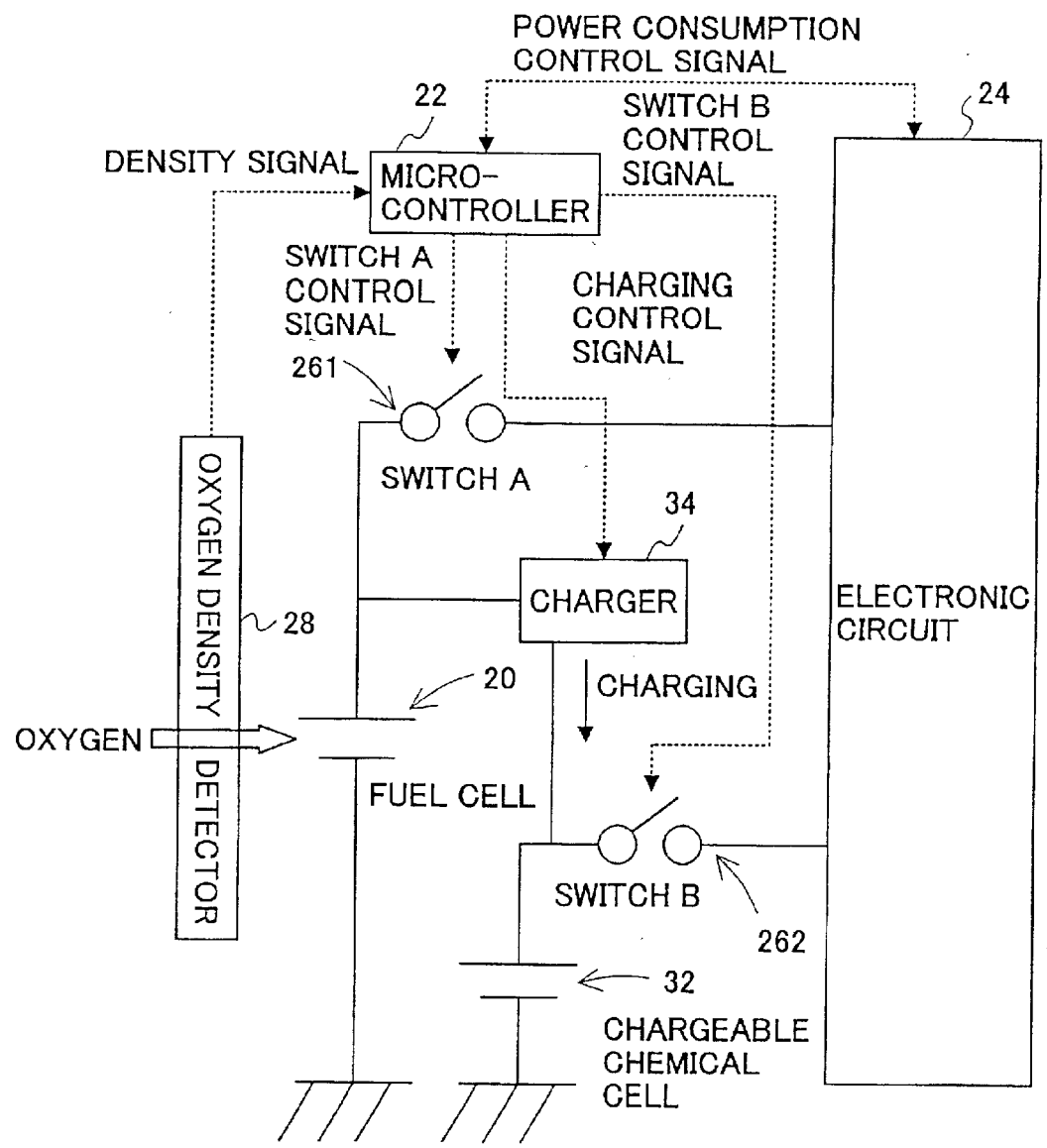
FIG. 8 is a block diagram showing a structure of the third embodiment of the present invention.

The electronic apparatus according to the third embodiment has the structure shown in FIG. 8. The same components as shown in FIGS. 2 and 6 are referred to using the same numerals.

The electronic apparatus shown in FIG. 8 is provided with the fuel cell 20, the microcontroller 22, the electronic circuit 24, and the oxygen density detector 28. The electronic circuit is further provided with a first switch $26_1$, (SWITCH A), a second switch $26_2$ (SWITCH B), a chargeable chemical cell 32, and a charger 34.

The electronic circuit 24 can be provided with electric power by the fuel cell 20 through the first switch $26_1$, and by the chemical cell 32 through the second switch $26_2$. The microcontroller 22 outputs, in response to the density signal sent from the oxygen density detector 28, a switch A control signal that turns on/off the first switch $26_1$, a switch B control signal that turns on/off the second switch $26_2$, and a charging control signal that activates the battery charger 34. The output terminal of the fuel cell 20 is connected to the chargeable chemical cell 32 through the charger 34 so that the fuel cell 20 can charge the chargeable chemical cell 32.

The microcontroller 22 and the electronic circuit 24 control the power consumption of the electronic circuit 24, except for the suspend operation, as described in connection to the first embodiment shown in FIGS. 2, 3, 4, and 5.

Figure 9:
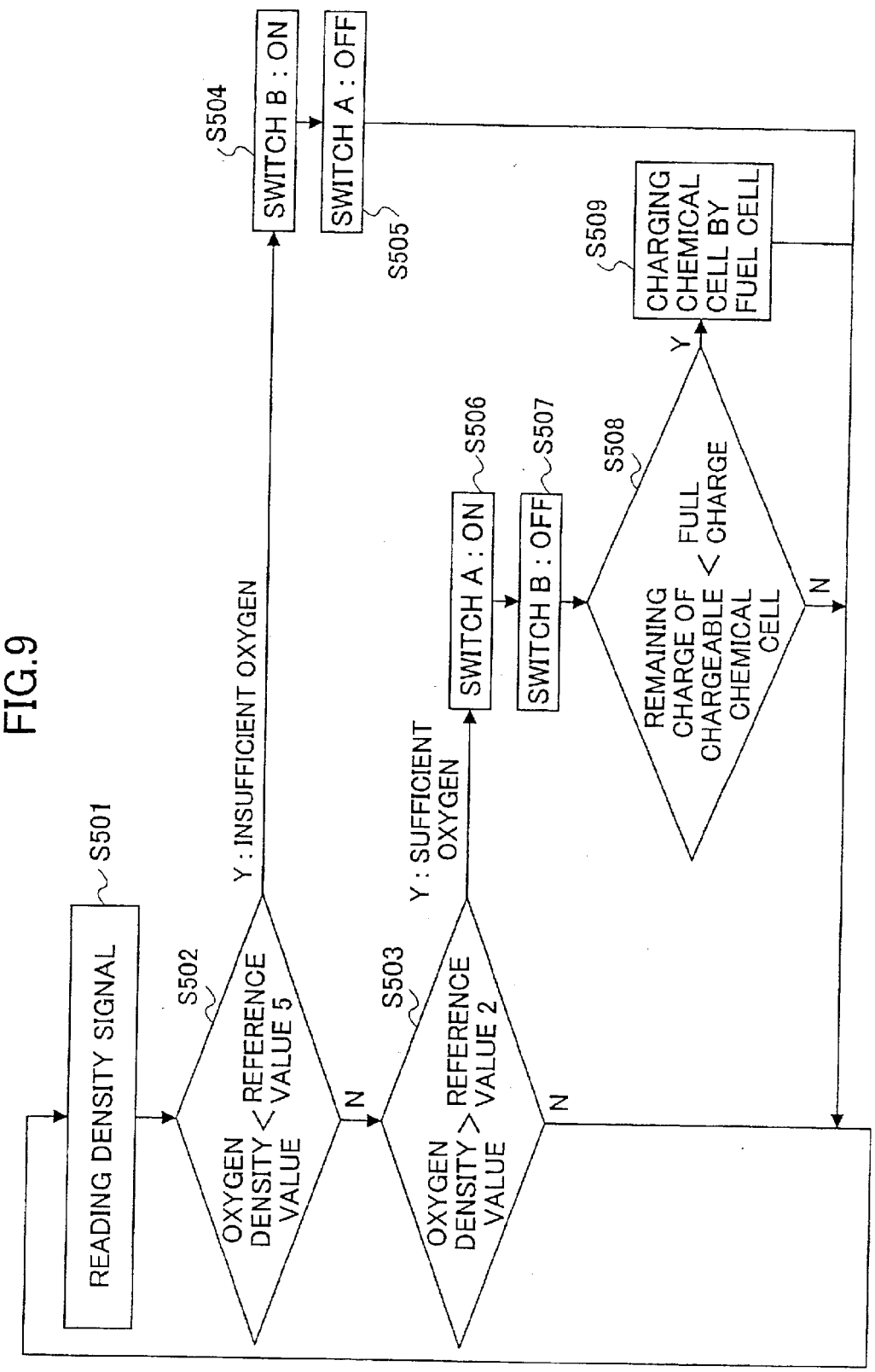
FIG. 9 is a flow diagram showing an operation of a microcontroller of the third embodiment.

While the microcontroller controls power consumption of the electronic circuit 24 as shown in FIG. 3, the microcontroller 22 controls power supply by selecting either the fuel cell 20 or the chargeable chemical cell 32 as shown in FIG. 9.

The microcontroller 22 normally provides a switch A control signal to the first switch $26_1$ (SWITCH A) to turn on the first switch $26_1$ and a switch B control signal to the second switch $26_2$ (SWITCH B) to turn off the second switch $26_2$. In an ordinary condition, the electronic circuit 24 is powered by the fuel cell 20.

As shown in FIG. 9, the microcontroller 22 reads the density signal from the oxygen density detector 28 (S501), compares the oxygen density value with the reference values, and switches, if necessary, to the chargeable chemical cell.

Particularly, the microcontroller 22 determines whether the oxygen density value is smaller than the reference value 5, the threshold of the suspend operation (S502). If the oxygen density value is greater than the reference value 5 (N branch of S502), the microcontroller 22 further determines whether the oxygen density value is greater than the reference value 2 that indicates the oxygen density is sufficiently high (S503). In the case that the oxygen density value is greater than the reference value 5 and smaller than the reference value 2, the microcontroller 22 repeatedly reads the density signal from the oxygen density detector 28 (S501). The microcontroller 22 compares the oxygen density value with the reference values 5 and 2. The electronic circuit 24 is continuously powered by the fuel cell 20 through the first switch $26_1$.

If the oxygen density in the air near the fuel cell 20 lowers, and the oxygen density value becomes smaller than the reference value 5 (Y branch of S502), the microcontroller 22, by reversing the state of the switch A control signal and the switch B control signal, turns on the second switch $26_2$ and turns off the first switch $26_1$, (S504 and S505). As a result, the chargeable chemical cell 32 starts providing electric power to the electronic circuit 24 through the second switch $26_2$, and the fuel cell 20 stops providing electric power to the electronic circuit 24.

In the event that the oxygen density in the air provided to the fuel cell 20 is too low for the fuel cell 20 to provide enough electric power to support the normal operation of the electronic circuit 24 (the case where the oxygen density value is smaller than the reference value 5), the microcontroller 22 switches, instead of suspending the operation of the electronic circuit 24, to the chargeable chemical cell 34 from the fuel cell 24 so that the electronic circuit 24 can operate normally.

Under the situation described above, if the oxygen density in the air around the fuel cell 20 recovers, and the oxygen density value becomes greater than the reference value 2 (Y branch of S503), the microcontroller 22, by reversing the state of the switch A control signal and the switch B control signal, further turns on the first switch $26_1$ and turns off the second switch $26_2$ (S506 and S507). As a result, the fuel cell 20 starts providing electric power to the electronic circuit 24 through the first switch $26_1$, and the chargeable chemical cell 32 stops providing electric power to the electronic circuit 24. That is, once the oxygen density in the air around the fuel cell 20 becomes normal, the electronic circuit 24 is powered by the fuel cell 20 instead of the chargeable chemical cell 34.

After switching to the fuel cell from the chargeable chemical cell 32, the microcontroller 22 measures, for example, the output voltage of the chargeable chemical cell 34 and determines whether the remaining charge of the chargeable chemical cell 32 is less than a predetermined amount (for example, the full charge) based on the output voltage (S508). If the remaining charge of the chargeable chemical cell 34 is determined to be less than the predetermined amount (Y branch of S508), the microcontroller 22 outputs a charging control signal to the charger 32 (S509). In response to the charging control signal, the charger 34 starts charging the chargeable chemical cell 34 with the electric power generated by the fuel cell 20.

As described above, if the oxygen density in the air around the fuel cell 20 is high enough (the case where the oxygen density value is greater than the reference value 2), the fuel cell provides electric power to the electronic circuit 24 and charges the chargeable chemical cell 34. Accordingly, even if the fuel cell 20 is switched to the chargeable chemical cell 34 due to low oxygen density, the chargeable chemical cell 34 is fully charged so that the electronic circuit 24 can operate normally.

In the above description, it is assumed that the oxygen density value decreases under the reference value 5. However, in the case that the oxygen density value falls down to a level higher than the reference value 5 and lower than the reference value 2, the same procedure is followed. That is, because the fuel cell 20 is continuously providing electric power to the electronic circuit 24 under such a condition, the microcontroller 22 checks that the first switch 26$_1$ is on (S506) and the second switch 26$_2$ is off (S507), followed by the charging of the chargeable chemical cell 34 (S508 and S509). The chargeable chemical cell 34 remains charged in spite of natural discharge that lowers the charged level of the chargeable chemical cell 34 even if the chargeable chemical cell 34 is not providing electric power to the electronic circuit 24.

Additionally, it is assumed in the description of the third embodiment that the power supply is switched from the fuel cell 20 to the chargeable chemical cell 32, instead of suspending the operation of the electronic circuit 24 as in a step of the power consumption control according to the first embodiment. Switching to the chargeable chemical cell 34 according to the third embodiment is, however, independent from the power consumption control according to the first embodiment, and is independently applicable to an electronic apparatus. Otherwise, the structure including the oxygen density regulator according to the second embodiment may be applied, in parallel, together with the power consumption control according to the first embodiment and the switching to a chargeable chemical cell according to the third embodiment.

The oxygen density in the air provided to the fuel cell 20 is measured by the oxygen density detector 28 provided in the neighborhood of the fuel cell 20 according to the above embodiments. It is also possible to calculate a value of oxygen density based on the comparison between the change in the output voltage over time of the fuel cell 20 at a certain oxygen density and the change in the output voltage over time of the fuel cell 20 in a sufficient oxygen environment.

The present invention is not limited to these embodiments, but various variations and modifications may be made without departing from the scope of the present invention.

This patent application is based on Japanese priority patent application No. 2001-266402 filed on Sep. 3, 2001, the entire contents of which are hereby incorporated by reference.

What is claimed is:

1. An electronic apparatus, comprising:
   an electronic circuit;
   a fuel cell that generates electric power by reacting fuel with oxygen contained in air, and provides said electric power to said electronic circuit;
   an oxygen density detector that detects oxygen density contained in the air provided to said fuel cell; and
   a controller that regularly reads a first signal indicating said oxygen density obtained from said oxygen density detector, and controls power consumption of said electronic circuit.

2. The electronic apparatus as claimed in claim 1, wherein said controller stores said first signal therein, determines whether said first signal stored therein falls within one of a plurality of oxygen density ranges, and sends, if said first signal stored therein falls within an identified one of said oxygen density ranges, a second signal to said electronic circuit.

3. The electronic apparatus as claimed in claim 2, wherein said electronic circuit has a plurality of power consumption modes each corresponding to one of a plurality of said oxygen density ranges, reads, in response to reception of said second signal, said first signal stored in said controller, and selects one of said power consumption modes thereof.

4. The electronic apparatus as claimed in claim 3, further comprising:
   a non-volatile memory which stores information, stored in said electronic circuit, therein when said electronic circuit selects a predetermined one of said power consumption modes; and
   a switch that stops providing said electric power to said electronic circuit in response to said storing of said information stored in said electronic circuit to said non-volatile memory.

5. The electronic apparatus as claimed in claim 1, further comprising an oxygen density regulator which has a plurality of operation modes each corresponding to one of a plurality of oxygen density ranges,
   wherein said controller sets, in response to said first signal, said oxygen density regulator to an identified one of said operation modes corresponding to an identified one of said oxygen density ranges within which said first signal falls, by sending a third signal to said oxygen density regulator.

6. The electronic apparatus as claimed in claim 5, wherein if said oxygen density falls within a predetermined range, said oxygen density regulator stops providing said air to said fuel cell.

7. The electronic apparatus as claimed in claim 1, further comprising:
   a chemical cell that generates electric power without consuming oxygen; and
   a switch that selects either said fuel cell or said chemical cell and connects selected one to said electronic circuit.

8. The electronic apparatus as claimed in claim 7, further comprising a charger,
   wherein
   said chemical cell is chargeable;
   said controller sends a third signal to said charger if said oxygen density falls within a predetermined range; and
   said charger charges, in response to reception of a third signal sent by said controller, said chemical cell.

9. The electronic apparatus as claimed in claim 1, further comprising a display unit that indicates a message if said oxygen density falls below a predetermined level.

* * * * *